(12) United States Patent
Kitano

(10) Patent No.: US 9,230,314 B2
(45) Date of Patent: Jan. 5, 2016

(54) INFORMATION PROCESSING DEVICE HAVING A FUNCTION TO CONTROL QOS OF MEDIA ANALYSIS SYSTEM

(75) Inventor: Takatoshi Kitano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 311 days.

(21) Appl. No.: 13/823,832

(22) PCT Filed: Nov. 2, 2011

(86) PCT No.: PCT/JP2011/006131
§ 371 (c)(1),
(2), (4) Date: Jul. 29, 2013

(87) PCT Pub. No.: WO2012/063434
PCT Pub. Date: May 18, 2012

(65) Prior Publication Data
US 2013/0301955 A1 Nov. 14, 2013

(30) Foreign Application Priority Data

Nov. 8, 2010 (JP) ................. 2010-249263

(51) Int. Cl.
G06K 9/54 (2006.01)
G06F 11/00 (2006.01)
G06F 15/173 (2006.01)
G06T 7/00 (2006.01)
H04N 17/00 (2006.01)

(52) U.S. Cl.
CPC ................ G06T 7/00 (2013.01); H04N 17/004 (2013.01)

(58) Field of Classification Search
None
See application file for complete search history.

(56) References Cited

U.S. PATENT DOCUMENTS 6,081,513 A * 6/2000 Roy .............................. 370/260
6,385,451 B1 * 5/2002 Kalliokulju et al. .......... 455/437
(Continued)

FOREIGN PATENT DOCUMENTS

CN 101326524 A 12/2008
JP 2000349769 A 12/2000
(Continued)

OTHER PUBLICATIONS

"Discovering the Best Web Service: A Neural Network-based Solution," Eyhab Al-Masri et al, Proceedings of the 2009 IEEE International Conference on Systems, Man, and Cybernetics, San Antonio, TX, USA—Oct. 2009, p. 4250-4255.*
(Continued)

Primary Examiner — Wenpeng Chen

(57) ABSTRACT

An information processing device includes a characteristics information storing unit for storing analysis characteristics information representing performance of each analysis method, and media characteristics information representing performance of each method of input of media data. The device includes a QoS calculating unit for calculating response performance and analysis accuracy when executing an analysis process in the media analysis system by preset media data input method and analysis method, based on the stored analysis characteristics information and media characteristics information. The device includes a QoS controlling unit for, in a case that at least one of the calculated response performance and analysis accuracy does not satisfy a preset target value, changing at least one of the preset media data input method and analysis method, based on the stored analysis characteristics information and media characteristics information.

8 Claims, 6 Drawing Sheets

(56) References Cited

U.S. PATENT DOCUMENTS

| | | | |
|---|---|---|---|
| 6,445,679 B1* | 9/2002 | Taniguchi et al. | 370/232 |
| 6,724,761 B1* | 4/2004 | Moy-Yee et al. | 370/390 |
| 7,006,472 B1* | 2/2006 | Immonen et al. | 370/332 |
| 7,177,295 B1* | 2/2007 | Sholander et al. | 370/338 |
| 7,532,134 B2* | 5/2009 | Samuels et al. | 341/87 |
| 8,238,293 B2* | 8/2012 | Pan | 370/329 |
| 2003/0235338 A1* | 12/2003 | Dye | 382/232 |
| 2004/0103181 A1 | 5/2004 | Chambliss et al. | |
| 2004/0194095 A1 | 9/2004 | Lumb et al. | |
| 2006/0203722 A1* | 9/2006 | Oommen | 370/229 |
| 2006/0209891 A1* | 9/2006 | Yamada et al. | 370/468 |
| 2006/0245369 A1* | 11/2006 | Schimmelpfeng et al. | 370/252 |
| 2007/0058669 A1* | 3/2007 | Hoffmann et al. | 370/466 |
| 2008/0123660 A1* | 5/2008 | Sammour et al. | 370/395.21 |
| 2009/0059937 A1* | 3/2009 | Kanada | 370/401 |
| 2009/0254654 A1* | 10/2009 | Jakob et al. | 709/224 |
| 2009/0268752 A1* | 10/2009 | Miyazaki et al. | 370/458 |
| 2011/0004885 A1* | 1/2011 | Kikuchi et al. | 718/104 |
| 2011/0244879 A1* | 10/2011 | Siomina et al. | 455/456.1 |
| 2011/0294518 A1* | 12/2011 | Siomina et al. | 455/456.1 |

FOREIGN PATENT DOCUMENTS

| | | | |
|---|---|---|---|
| JP | 2006521640 A | | 9/2006 |
| JP | 2008269391 A | | 11/2008 |
| JP | 2009075689 A | | 4/2009 |
| JP | 2009278582 A | | 11/2009 |
| WO | 2004088547 A2 | | 10/2004 |
| WO | WO 2009096519 A1 | * | 8/2009 |
| WO | 2009157939 A1 | | 12/2009 |

OTHER PUBLICATIONS

Chinese Office Action for CN Application No. 201180053812.7 issued on Dec. 16, 2014 with English Translation.

The international search report for PCT/JP2011/006131 mailed on Nov. 29, 2011.

The extended European search report for EP Application No. 11840649.5 dated on May 11, 2015.

Ibuccafurri F et al: "Analysis of QoS in cooperative services for real time applications", Data & Knowledge Engineering, Elsevier BV, NL, vol. 67, No. 3, Dec. 1, 2008, pp. 463-484, XP025585140, ISSN: 0169-023X, DOI: 10.1016/J.Datak.2008.08.004, Cited in ESR.

Hyun Jong Kim et al: "The QoE Evaluation Method through the QoS-QoE Correlation Model", Networked Computing and Advanced Information Management, 2008. NCM '08. Fourth International Conference on, IEEE, Piscataway, NJ, USA, Sep. 2, 2008, pp. 719-725, XP031320361, ISBN: 978-0/7695-3322-3, Cited in ESR.

Hyun Jong Kim et al: "A study on a QoSjQoE correlation model for QoE evaluation on IPTV service", Advanced Communication Technology (ICACT), 2010 the 12th International Conference on, IEEE, Piscataway, NJ, USA, Feb. 7, 2010, pp. 1377-1382, XP031653799, ISBN: 978-1-4244-5427-3, Cited in ESR.

* cited by examiner

Fig.2

| MEDIA TYPE / MEDIA CHARACTERISTICS | STILL IMAGE | MOVING IMAGE (avi) | SPEECH (wav) |
|---|---|---|---|
| SIZE (kbyte) | 1 | 1 | 1 |
| SPATIAL DENSITY (bit/pxcel) | 1 | 1 | 0 |
| TIME DENSITY (byte/msec) | 0 | 1 | 1 |

Fig.3

| MEDIA TYPE | MEDIA CHARACTERISTICS | CHARACTERISTICS CONVERSION LOWER LIMIT VALUE | PERFORMANCE OF INPUT TRANSFER |
|---|---|---|---|
| IMAGE | SIZE (kbyte) | SIZE × 0.2 | SIZE (kbyte) × 2 |
| MOVING IMAGE | SPATIAL DENSITY | SPATIAL DENSITY × 0.2 | SPATIAL DENSITY × 10PIXEL/DOT |

Fig.4

| MEDIA TYPE | STORING METHOD | RESPONSE PERFORMANCE OF STORAGE (MILLISECOND) |
|---|---|---|
| IMAGE | HDD | SIZE(kbyte) × SIZE(kbyte)/1000 |
| IMAGE | MEMORY | 10 × SIZE(kbyte)/1000 |

Fig.5

| ANALYSIS ENGINE ID | MEDIA TYPE | ANALYSIS METHOD | ESSENTIAL | SUBSTITUTABLE ANALYSIS METHOD | ACCURACY (%) | PERFORMANCE (MILLISECOND) |
|---|---|---|---|---|---|---|
| ANALYSIS ENGINE A | IMAGE | FACE CONTOUR ACQUISITION | O | NONE | SIZE/100 × 90 | SIZE × SIZE /(1000 × 1000) |
| | | FACE MATCHING JUDGMENT IN COLOR | O | FACE MATCHING JUDGMENT BY BLACK-AND-WHITE CONVERSION | SIZE × SPATIAL DENSITY /100 × 8 | 10 × SPATIAL DENSITY |
| | | FACE MATCHING JUDGMENT BY BLACK-AND-WHITE CONVERSION | × | FACE MATCHING JUDGMENT IN COLOR | SIZE × SPATIAL DENSITY /100 × 8 | 2 × SPATIAL DENSITY |
| | | BLACK-AND-WHITE CONVERSION | O | NONE | 60% | 1000ms |
| ANALYSIS ENGINE B | MOVING IMAGE | FACE DETECTION | O | NONE | SIZE/SPATIAL DENSITY × 100 | SIZE/1024kbyte |

Fig.6

| USER | RESPONSE SPEED OF MEDIA SYSTEM(ms) | ANALYSIS ACCURACY |
|---|---|---|
| USER A | 300 | 70% |
| USER B | 500 | 80% |
| USER C | 1000 | 95% |

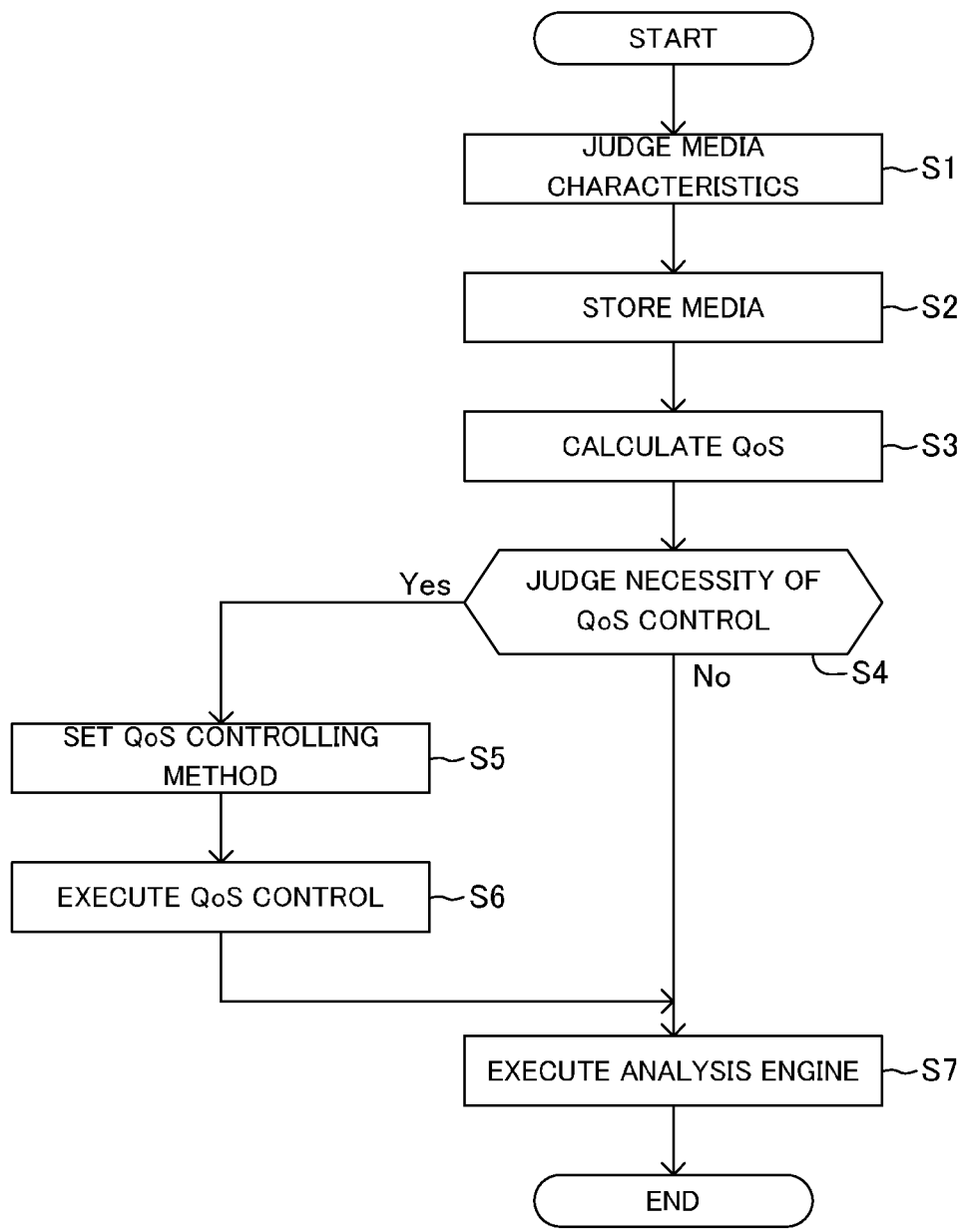

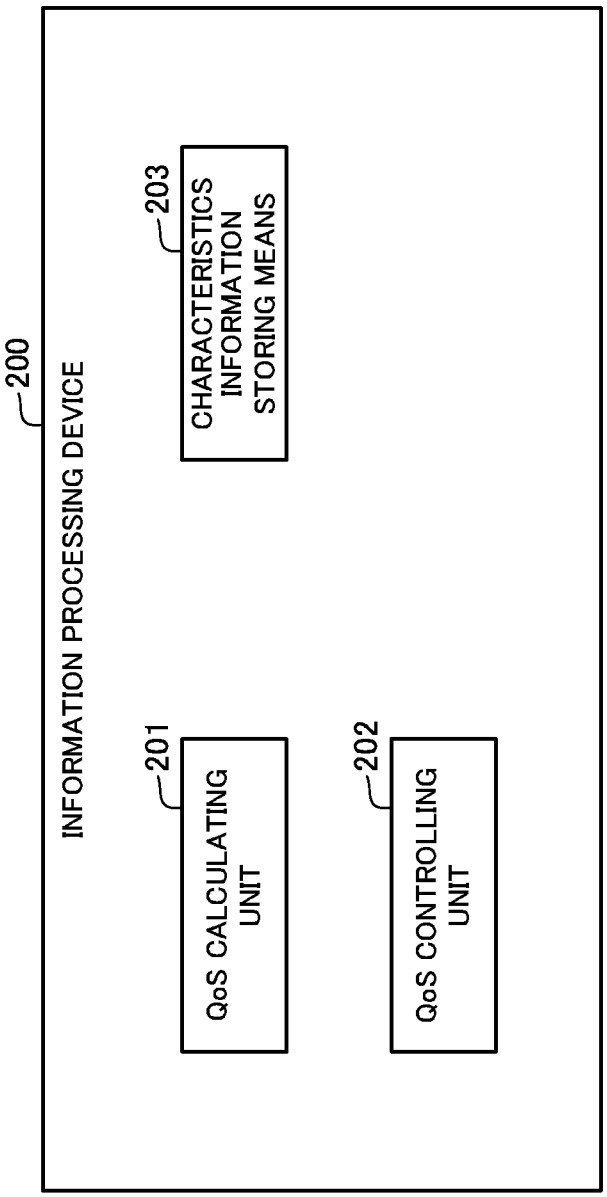

INFORMATION PROCESSING DEVICE HAVING A FUNCTION TO CONTROL QOS OF MEDIA ANALYSIS SYSTEM

This application is a National Stage Entry of PCT/JP2011/006131 filed Nov. 2, 2011, which claims priority from Japanese Patent Application 2010-249263 filed Nov. 8, 2010, the contents of all of which are incorporated herein by reference, in their entirety.

TECHNICAL FIELD

The present invention relates to an information processing device, more specifically, relates to an information processing device which has a function of controlling the QoS of a media analysis system including an analysis engine for analyzing media.

BACKGROUND ART

For a system which receives a plurality of inputs like media and binary files, such as a media analysis system including an analysis engine for analyzing media, there is a technique of controlling the QoS (Quality of Service) of the system. Examples of the technique of controlling the QoS of the system are disclosed in Patent Documents 1 and 2.

A technique disclosed in Patent Document 1 is setting priorities in accordance with a plurality of requests based on workloads and selecting queues in accordance with the values of waiting times of the requests, thereby efficiently using resources and keeping the QoS constant. A technique disclosed in Patent Document 2 is determining a QoS parameter of a network based on a load status of the network and controlling a transfer data amount of the network, thereby keeping the QoS constant.

PATENT DOCUMENTS

Patent Document 1: Japanese Unexamined Patent Application Publication (Translation of PCT Application) No. 2006-521640
Patent Document 2: Japanese Unexamined Patent Application Publication No. 2000-349769

However, in the techniques disclosed in Patent Documents described above, a relation between media characteristics of input media and QoS characteristics of the analysis system for the media characteristics is not managed, so that it is impossible to regulate the QoS of the analysis system in consideration of the output accuracy of the media analysis system. For example, in the techniques disclosed in Patent Documents, a relation between the performance and the accuracy is not considered, so that it is difficult to regulate the QoS characteristics such as increase the performance while decreasing the accuracy so that performance and accuracy of target values are satisfied. Consequently, there arises a problem that it is difficult for a developer of a media application to develop the application.

The term "media characteristics" represents the "characteristics" of a media, which are defined for each type of media and have an influence on the performance and the accuracy at the time of transfer of media by input of media, storage of media, or analysis of media. The term "QoS characteristics" of an analysis system represents the performance of a media storage region determined by the media characteristics and a storing means for storing media, and the accuracy and performance of an analysis engine determined by the media characteristics and an analysis method.

SUMMARY

Accordingly, an object of the present invention is to solve the aforementioned problem that it is difficult for a developer of a media application to develop because it is difficult to regulate the QoS characteristics of an analysis system.

In order to achieve the object, an information processing device according to an exemplary embodiment of the present invention includes:

a characteristics information storing means for storing analysis characteristics information representing performance of each analysis method executed in a media analysis system which analyzes predetermined media data, and media characteristics information representing performance of each method of input of the media data inputted into and analyzed by the media analysis system;

a QoS calculating unit for calculating response performance and analysis accuracy when executing an analysis process in the media analysis system by preset media data input method and analysis method, based on the analysis characteristics information and the media characteristics information stored by the characteristics information storing means; and a QoS controlling unit for, in a case that at least one of the response performance and the analysis accuracy calculated by the QoS calculating unit does not satisfy a preset target value, changing at least one of the preset media data input method and analysis method, based on the analysis characteristics information and the media characteristics information stored by the characteristics information storing means.

Further, a computer program according to another exemplary embodiment of the present invention is a computer program which includes instructions for causing an information processing device including a characteristics information storing means for storing analysis characteristics information representing performance of each analysis method executed in a media analysis system analyzing predetermined media data, and media characteristics information representing performance of each method of input of the media data inputted into and analyzed by the media analysis system, to realize:

a QoS calculating unit for calculating response performance and analysis accuracy when executing an analysis process in the media analysis system by preset media data input method and analysis method, based on the analysis characteristics information and the media characteristics information stored by the characteristics information storing means; and a QoS controlling unit for, in a case that at least one of the response performance and the analysis accuracy calculated by the QoS calculating unit does not satisfy a preset target value, changing at least one of the preset media data input method and analysis method, based on the analysis characteristics information and the media characteristics information stored by the characteristics information storing means.

Further, an information processing method according to another exemplary embodiment of the present invention, wherein analysis characteristics information representing performance of each analysis method executed in a media analysis system which analyzes predetermined media data, and media characteristics information representing performance of each method of input of the media data inputted into and analyzed by the media analysis system are stored in a characteristics information storing means, the information processing method including:

calculating response performance and analysis accuracy when executing an analysis process in the media analysis system by preset media data input method and analysis method, based on the analysis characteristics information and the media characteristics information stored in the characteristics information storing means; and in a case that at least one of the response performance and the analysis accuracy having been calculated does not satisfy a preset target value, changing at least one of the preset media data input method and analysis method, based on the analysis characteristics information and the media characteristics information stored in the characteristics information storing means.

With the configurations as described above, the present invention can facilitate regulation of the QoS characteristic of an analysis system and achieve increase of convenience in development by a developer of a media application.

BRIEF DESCRIPTION OF DRAWINGS

FIG. 2 is a diagram showing an example of data stored in an acquisition media characteristics rule managing unit disclosed in FIG. 1;

FIG. 3 is a diagram showing an example of QoS characteristics data of a media inputting unit, stored in a media system QoS characteristics knowledge managing unit disclosed in FIG. 1;

FIG. 4 is a diagram showing an example of QoS characteristics data of a media storing unit, stored in the media system QoS characteristics knowledge managing unit disclosed in FIG. 1;

FIG. 5 is a diagram showing an example of QoS characteristics data of an analysis engine, stored in the media system QoS characteristics knowledge managing unit disclosed in FIG. 1;

FIG. 6 is a diagram showing an example of data stored in a target non-functional requirement managing unit disclosed in FIG. 1;

FIG. 7 is a flowchart showing an operation of a QoS controlling device disclosed in FIG. 1; and FIG. 8 is a block diagram showing a configuration of an information processing device in supplementary note 1 of the present invention.

EXEMPLARY EMBODIMENTS

First Exemplary Embodiment

Figure 1:
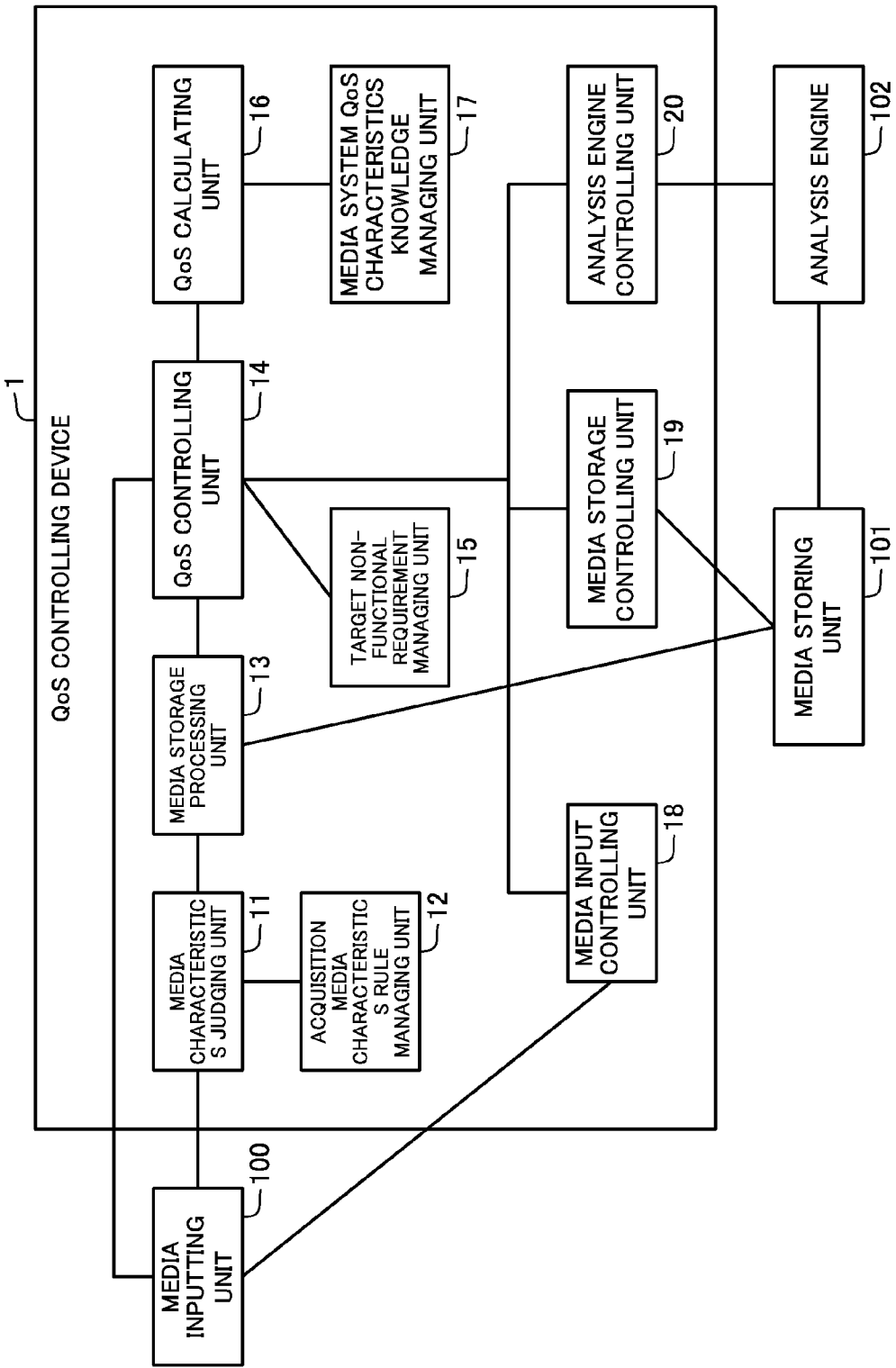
FIG. 1 is a block diagram showing a whole configuration of a media analysis system in a first exemplary embodiment of the present invention.

A first exemplary embodiment of the present invention will be described with reference to FIGS. 1 to 7. FIGS. 1 to 6 are diagrams for describing the configuration of a media analysis system in this exemplary embodiment, and FIG. 7 is a diagram for describing the operation.

[Configuration]

The configuration of a media analysis system in the first exemplary embodiment of the present invention, specifically, the configuration of a QoS controlling device 1 is shown in FIG. 1. As shown in FIG. 1, the media analysis system includes a media inputting unit 100 that accepts input of media data to be analyzed, a media storing unit 101 that stores the media data, and an analysis engine 102 that receives the media data and executes an analysis process. The media analysis system also includes a QoS controlling device 1 to which the units 100, 101 and 102 are connected as external devices and which controls the QoS (Quality of Service) that is the quality of the system, such as the analysis accuracy and response performance in the media analysis system.

In the present invention, installation of the QoS controlling device 1 allows a developer of a media application to transparently use the QoS controlling device 1 and develop an application based on a functional request without being conscious of the QoS characteristics of an analysis method of the media analysis engine. Below, the configuration of the QoS controlling device 1 will be described in detail.

As shown in FIG. 1, the QoS controlling device 1 includes a media characteristics judging unit 11, an acquisition media characteristics rule managing unit 12, a media storage processing unit 13, a QoS controlling unit 14, a target non-functional requirement managing unit 15, a QoS calculating unit 16, and a media system QoS characteristics knowledge managing unit 17. Moreover, the QoS controlling unit 1 includes a media input controlling unit 18, a media storage controlling unit 19, and an analysis engine controlling unit 20.

Each of the abovementioned units 11 to 20 is configured by a functioning unit structured by embedding a program in an arithmetic device installed in the QoS controlling unit 1, or a storing unit formed in an installed storage device. The QoS controlling device 1 may be configured by one information processing device, or may be configured by a plurality of information processing devices. Below, the respective components will be described in detail.

Firstly, the media inputting unit 100 inputs media data into the QoS controlling device 1. The media storing unit 101 can return a storage location for storing media, and holds a substitutable storing means such as an HDD (Hard Disk Drive) and a memory. The external analysis engine 102 holds types of media that can be analyzed, analysis methods used at the time of analyzing media, and analysis methods which are substitutable for the analysis methods.

The acquisition media characteristics rule managing unit 12 manages whether to cause the media characteristics judging unit 11 to acquire media characteristics from media data. Thus, the media characteristics judging unit 11 is caused by the acquisition media characteristics rule managing unit 12 to receive input of media files from the external media inputting unit 100 and acquire media characteristics such as the size and spatial density based on the types of the received media, for each media type.

FIG. 2 shows a structure diagram of a data structure of data managed by the acquisition media characteristics rule managing unit 12. As shown in FIG. 2, the acquisition media characteristics rule managing unit 12 manages media characteristics that should be acquired depending on the media types. The data shown in FIG. 2 may include any number of media characteristics and any number of media types. In the data, "1" represents a media characteristic to acquire, and "0" represents a media characteristic not to acquire.

Then, the media characteristics judging unit 11 determines a media characteristic to acquire from media data such as a static image, a moving image and a speech inputted by the media inputting unit 100 based on the rules of acquisition of media characteristics managed by the acquisition media characteristics rule managing unit 12, and acquires a media characteristics value from the media data. Then, the media characteristics judging unit 11 transmits the acquired media characteristics value of the media data to the media storage processing unit 13.

The media storage processing unit 13 stores the inputted media data into the media storing unit 101, and acquires a storage location of the media data. Moreover, the media storage processing unit 13 transmits the media characteristics value and storage location of the stored media data to the QoS controlling unit 14 as media metadata. The media storing unit 101 stores the media data and returns a storage location of the media to the media storage processing unit 13.

The QoS calculating unit 16 calculates expected response performance of the media analysis system and expected analysis accuracy, from the type of the analysis engine 102 and the abovementioned media characteristics value. To be specific, the QoS calculating unit 16 calculates response performance and analysis accuracy in the media analysis system, based on QoS characteristics knowledge of the media inputting unit 11, the media storing unit 101 and the analysis engine 102, which are managed and stored by the media system QoS characteristics knowledge managing unit 17.

Herein, information stored by the media system QoS characteristics knowledge managing unit 17 (a characteristic information storing means) will be described in detail with reference to FIGS. 3 to 5.

FIG. 3 is a diagram showing an example of QoS characteristics (media characteristics information) that are managed by the media system QoS characteristics knowledge managing unit 17 and that represent the performance of respective input methods by the media inputting unit 100. As shown in FIG. 3, "type of media data" such as image, moving image or speech, "media characteristics" representing the characteristics of media data, "characteristics conversion lower limit value" that is a lower limit value allowable for conversion of the characteristics in conversion of media data into a certain media characteristic, and a calculation formula of "performance of transfer (millisecond)" of inputted media data are stored as the QoS characteristics of the media inputting unit 100.

A calculation formula stored in the "characteristics conversion lower limit value" represents another input method (conversion method) that is substitutable for a method (conversion method) of inputting media data having been inputted by converting into the size or the spatial density represented by the "media characteristics."

Further, the "performance of transfer" is a formula for calculating response performance relating to a processing time in the media analysis system. Based on this formula, a time for processing media data converted into the value of the size or spatial density that is an input method is calculated.

FIG. 4 is a diagram showing an example of QoS characteristics (media characteristics information) of respective methods for inputting, namely, storing media data of an analysis target into the media storing unit 101. As shown in FIG. 4, "storage method" representing a media storage destination as a method for storing media data and "response performance of storage" representing a formula of calculation of response performance of storing media data are stored as the QoS characteristics of the media storing unit 101.

The "response performance of storage" represents a method for storing inputted media data and, for example, "memory" is set as a storage destination that is another storage method substitutable for a storage destination "HDD."

In the present invention, as described later, based on the QoS characteristics of the media inputting unit 100 and the media storing unit 101 shown in FIGS. 3 and 4 stored in the media system QoS characteristics knowledge managing unit 17, a method for converting inputted media data and an input method such as a storage destination are changed.

FIG. 5 is a diagram showing an example of QoS characteristics (analysis characteristics information) that are managed by the QoS characteristics knowledge managing unit 17 and that represent the performance of an analysis method by the analysis engine 102. As shown in FIG. 5, "analysis engine," "media type" corresponding to the analysis engine 102, "analysis method" used by the analysis engine 102, information representing whether the analysis method is "essential" for the analysis engine 102, and information representing whether there is a "substitute analysis method" that is substitutable for the aforementioned analysis method are set as the QoS characteristics of the analysis engine 102. In addition, in the QoS characteristics of the analysis engine 102, calculation formulas for respectively calculating "analysis accuracy" in each analysis method and "response performance" as an analysis processing time are registered.

The target non-functional requirement managing unit 15 stores target values of "response speed" representing a processing time in the media analysis system and "analysis accuracy" for each user as shown in FIG. 6. As described later, in a case that at least one of the response speed and the analysis accuracy calculated by the QoS calculating unit 16 does not satisfy the target value, an input method or an analysis method is changed.

The QoS calculating unit 16 calculates a time (a processing time) for transfer by the media inputting unit 100, a time (a processing time) that the media storage processing unit 13 stores a media into the media storing unit 101, and response performance (a processing time) and analysis accuracy of the analysis engine 102, from the values of the media characteristics data calculated by the media characteristics judging unit 11 and the QoS characteristics (media characteristics information, analysis characteristics information) of the media inputting unit 100, the media storing unit 101 and the analysis engine 102 that are stored in the media system QoS characteristics knowledge managing unit 17 (a characteristic information storing means).

Then, the QoS calculating unit 16 calculates the total value of the calculated times (processing times) as the response performance (millisecond) of the whole media analysis system, and also calculates the analysis accuracy of the whole analysis system from the analysis accuracy of the analysis engine 102. As the analysis accuracy of the analysis engine 102, the analysis accuracy of each media characteristic set for each analysis engine shown in FIG. 5 is calculated. At this moment, in a case that there is a relation between the analysis methods of the analysis engine 102, the strength of the relation may be given as a weight to the accuracy calculation formula.

In a case that the response performance and analysis accuracy of the media analysis system calculated by the QoS calculating unit 16 do not satisfy the user's target response performance and analysis accuracy managed by the target non-function requirement managing unit 15, the QoS controlling unit 14 sends a query whether it is possible to increase the accuracy and the performance so that the user's target performance and accuracy are satisfied to the QoS calculating unit 16. Based on the respective QoS characteristics that are managed by the media system QoS characteristics knowledge managing unit 17 and that include rules of calculation of the accuracy and the performance set for each of the media inputting unit 100, the media storing unit 101 and the analysis engine 102, the QoS calculating unit 16 changes the media data input method and the media data analysis method, and returns a performance increase value representing how much the performance can increase from the original performance in order to determine whether it is possible to increase the performance of each of the units. Moreover, the analysis engine 102 additionally returns the analysis accuracy.

Based on the performance increase values of the media inputting unit 100, the media storing unit 101 and the analysis engine 102 calculated by the QoS calculating unit 16 and based on the analysis accuracy of the analysis engine 102, in a case that the analysis accuracy exceeds the user's target accuracy managed by the target non-functional requirement managing unit 105, the QoS controlling unit 14 determines a controlling unit to execute control of changing the input method or the analysis method from among the units 18, 19 and 20 for controlling the media inputting unit 100, the media storing unit 101 and the analysis engine 102 so that the response performance satisfies the user's target value, and executes QoS control on the determined controlling unit. For example, in the case of controlling the media inputting unit 100, the QoS controlling unit 14 instructs the media controlling unit 18 to execute QoS control. In the case of controlling the media storing unit 101, the QoS controlling unit 14 instructs the media storage controlling unit 19 to execute QoS control. In the case of controlling the analysis engine 102, the QoS controlling unit 14 instructs the analysis engine controlling unit 20 to execute QoS control.

The media input controlling unit 18 controls the media inputting unit 100 so as to convert the characteristics of media data in accordance with an input method designated to be changed by the QoS controlling unit 14.

The media storage controlling unit 19 designates a method, namely, a destination for storage of media data designated to be changed by the QoS controlling unit 14, and controls so as to store the media data.

The analysis engine controlling unit 20 designates a substitute method for an analysis method of the analysis engine 102 designated by the QoS controlling unit 14, and controls the analysis engine 102 so that the analysis engine 102 analyzes by the method.

[Operation]

Next, the operation of the media analysis system, specifically, the operation of the QoS controlling device 1 will be described with reference to a flowchart shown in FIG. 7.

Firstly, when media data is inputted by the media inputting unit 100, the media characteristics judging unit 11 determines media characteristics to acquire from the media data, based on the data stored by the acquisition media characteristics rule managing unit 12 shown in FIG. 2 (step S1). Then, the media characteristics judging unit 11 calculates media characteristics values from the media data.

Subsequently, the media storage processing unit 13 stores the media data into the media storing unit 101 (step S2), and acquires a storage location of the media data. Then, the media storage processing unit 13 transmits the storage location of the media data and the types and values of the media characteristics acquired by the media characteristics judging unit 11, to the QoS controlling unit 14.

Subsequently, the QoS controlling unit 14 instructs the QoS calculating unit 16 to calculate the QoS of the media analysis system based the media characteristics of the media data having been acquired. Then, the QoS calculating unit 16 firstly receives the media characteristics of the inputted media data and the values thereof, and calculates an input transfer time corresponding to the input method of the media data, based on the QoS characteristics of the media inputting unit 100 shown in FIG. 3 managed by the media system QoS characteristics knowledge managing unit 17 (step S3).

Subsequently, from the values of the media characteristics, the QoS calculating unit 16 calculates the response performance of the media storing unit 101, by using the calculation formula of the response performance of media storage, based on the QoS characteristics of the media storing unit 101 shown in FIG. 4 managed by the media system QoS characteristics knowledge managing unit 17 (step S3).

Furthermore, with the media characteristics calculated by the media characteristics judging unit 101 as an input, the QoS calculating unit 16 calculates the response performance and analysis accuracy of the analysis engine 102, based on an essential analysis method of the analysis engine 102 used in the system and the calculation formulas of the analysis accuracy and response performance managed for each analysis method as shown in FIG. 5 (step S3).

Subsequently, the QoS controlling unit 14 acquires the target values of the response performance (millisecond) and analysis accuracy (%), which are user's target values, from the target non-functional requirement managing unit 15 as shown in FIG. 6 and, in a case that either the value of the response performance or the value of the analysis accuracy calculated at step S3 does not satisfy the target value, determines that QoS control is necessary (step S4: Yes) and proceeds to step S5. In a case that the values of the response performance and analysis accuracy calculated at step S3 exceed the target values, the QoS controlling unit 14 proceeds to step S7.

Subsequently, at step S5, in order to determine the possibility of increase of the QoS, the QoS controlling unit 14 confirms whether the user's target performance and accuracy can be satisfied, and determines a method for controlling the QoS. For this purpose, the QoS controlling unit 14 sends a query whether it is possible to increase the performance to the QoS calculating unit 16.

By using the respective QoS characteristics shown in FIGS. 3 to 5 representing the rules of calculation of the performance and accuracy of the media inputting unit 100, the media storing unit 101 and the analysis engine 102, which are managed by the media system QoS characteristics knowledge managing unit 17, the QoS calculating unit 16 returns "whether it is possible to increase the performance in each unit," "means for increasing the performance" and "performance increase value representing how much the performance increases from the original performance." The analysis engine 102 also returns "analysis accuracy" in addition to the above.

As "means for increasing the performance," the QoS calculating unit 16 returns a media characteristic that is a substitutable method for inputting media data and a conversion lower limit value of the media characteristic with regard to the media inputting unit 100, a substitutable destination for storing media data with regard to the media storing unit 101, and a substitutable analysis method when it is possible to increase the performance with regard to the analysis engine 102.

In a case that the accuracy calculated by the QoS calculating unit 16 exceeds the user's target value stored by the target non-functional requirement managing unit 15 shown in FIG. 6, the QoS controlling unit 14 determines a unit to execute QoS control from among the media inputting unit 100, the media storing unit 101 and the analysis engine 102 that the QoS calculating unit 16 has responded it is possible to increase the performance, and also determines a performance increasing means to be used from among the performance increasing means returned by the QoS calculating unit 16.

When determining the performance increasing means, the QoS controlling unit 14 selects any number of controlling units as targets to execute control from among the controlling units so that the user's target value is satisfied. For example, the QoS controlling unit 14 may select a controlling unit whose performance increase value corresponding to a performance increasing means is the highest, or may use a plurality of controlling units to satisfy the user's target value.

Then, at step S6, the QoS controlling unit 14 designates the control target unit and performance increasing means as a controlling method that have been determined, and instructs the media input controlling unit 18, media storage controlling unit 19 or analysis engine controlling unit 20 having been selected to execute QoS control. The QoS controlling unit 14 instructs the media input controlling unit 18 to execute QoS control in the case of controlling the media inputting unit 100, instructs the media storage controlling unit 19 to execute QoS control in the case of controlling the media storing unit 101, and instructs the analysis engine controlling unit 20 to execute QoS control in the case of controlling the analysis engine 102.

In a case that the control target selected by the QoS controlling unit 14 is the media inputting unit 100, the media input controlling unit 18 controls the media inputting unit 100 so as to convert the characteristic of the media data in accordance with the media characteristic and conversion value of the media characteristic designated by the QoS controlling unit 14.

In a case that the control target selected by the QoS controlling unit 14 is the media storing unit 101, the media storage controlling unit 19 designates the performance increasing means designated by the QoS controlling unit 14, as a storing method of media storage, and controls the media storing unit 101 to change the storing method of media storage.

In a case that the control target selected by the QoS controlling unit 14 is the analysis engine 102, the analysis engine controlling unit 20 designates a substitute analysis method of the analysis engine 102 designated by the QoS controlling unit 14, and controls the analysis engine 102 so that the analysis engine 102 analyzes by the method.

After that, at step S7, the QoS controlling unit 14 transmits the media data to the analysis engine 102, and the analysis engine 102 executes an analysis process thereon.

According to the present invention, owing to the operation as described above, even when it appears from calculation that the performance of the media analysis system exceeds the user's target value, it is possible to make the performance closer to one desired by the user in consideration of a relation between the accuracy and the performance, by making a performance increase instruction to decrease the input quality of the media inputting unit 100, change the storage method of the media storing unit 101 and thereby increase the response performance, or increase the response performance of the media analysis engine 102, in accordance with the user's target values of the accuracy and the performance. Consequently, it becomes easy to regulate the QoS characteristics of the media analysis system, and it is possible to achieve increase of convenience in development by a developer of a media application.

Example

Next, a specific example of the present invention will be described with reference to FIGS. 1 to 7 as described above. In this example, the media inputting unit 100 inputs a "face image" as media data into the media analysis system. The analysis engine 102 is an analysis engine 102 which recognizes a face image and determines the position of the face, and the ID of the analysis engine 102 is "analysis engine A." The media storing unit 101 stores images into an "HDD."

Firstly, the media inputting unit 100 inputs a face image of a person and transmits to the media characteristics judging unit 11, and the media characteristics judging unit 11 judges the characteristics of the media data (step S1). The media characteristics judging unit 11 judges the image is a still image based on the content type of the received media, and calculates the size and spatial density as the media characteristics of the media data based on the data managed by the acquisition media characteristics rule managing unit 12 as shown in FIG. 3. Thus, the media characteristics judging unit 11 calculates and obtains the values of the media characteristics: size is 100 kbyte and spatial density is 10 bit×10 bit. Then, the media characteristics judging unit 11 transmits the media characteristics to the media storage processing unit 13.

Subsequently, the media storage processing unit 37 stores the inputted face image into the media storing unit 101 (step S2), and acquires a URL, http://example.com/images/id/001, as the storage location of this image. The storage location of this image and the media characteristics values that are the types and values of the media characteristics acquired by the media characteristics judging unit 11 at step S1 are transmitted to the QoS controlling unit 14.

Subsequently, the QoS controlling unit 14 instructs the QoS calculating unit 16 to calculate the QoS, and the QoS calculating unit 16 calculates the response performance and analysis accuracy of the whole media analysis system, based on the media characteristics values (size is 100 kbyte and spatial density is 10 bit×10 bit) transmitted by the media storage processing unit 13 and based on the QoS characteristics representing the rules of calculation of the analysis accuracy and the response performance stored for each analysis engine 102, each media type and each analysis method, which are stored by the media system QoS characteristics knowledge managing unit 17. Below, the details of the calculation process will be described.

Firstly, the QoS calculating unit 16 receives the media characteristics values of the media data having been inputted, and calculates a time for transferring input of media data so as to correspond to the media type and the media characteristics based on the QoS characteristics of the media inputting unit 100 shown in FIG. 3 managed by the media system QoS characteristics knowledge managing unit 17. In this case, the QoS calculating unit 16 obtains 200 milliseconds from calculation 100×2 (milliseconds).

The QoS calculating unit 16 calculates the response performance of storage of the media storing unit 101 from a formula for calculating the response performance of media storage, based on the QoS characteristics of the media storing unit 101 shown in FIG. 4 managed by the media system QoS characteristics knowledge managing unit 17. Herein, with reference to FIG. 4, because the media type is "image" and the current storage method of the media storing unit 101 is "HDD," the QoS calculating unit 16 obtains 10 milliseconds as the response performance of storage from calculation 100×100/1000 (milliseconds).

Further, with reference to FIG. 5, because the analysis engine 102 is the analysis engine A, the QoS calculating unit 16 calculates the accuracy of the analysis engine 102 in the following manner. The accuracy of face contour acquisition is 90% from calculation 100/100×90, and the accuracy of an analysis method for face matching judgment is 80% from calculation 100×10/100×8. In calculation that the recognition succeeds by 80% of 90%, the combination accuracy is obtained from calculation (90/100)×(80/100)×100, and consequently, the accuracy of the analysis engine A is 72%. Moreover, regarding the response performance of the analysis engine 102, the performance of face contour acquisition is 0.01 milliseconds from calculation 100×100/(1000×1000), and the performance of face matching judgment is 100 milliseconds from calculation 10×10.

The QoS calculating unit 16 calculates the response performance of the media analysis system as the total value of the transfer performance of the media inputting unit 100, the storage performance of the media storing unit 101 and the response performance of the analysis engine 102. The value of the response performance of the media analysis system is 310.1 milliseconds from calculation 200+10+100.1=310.1. Moreover, the QoS calculating unit 16 calculates the accuracy of the media analysis system as 72% because it is the same as the accuracy of the analysis engine 102 (step S3).

After that, the QoS controlling unit 14 acquires the response performance of 300 milliseconds and the accuracy of 70% as target values with regard to a media system of a user A, who is the user of this system, from the target non-functional requirement managing unit 15 as shown in FIG. 6. Then, the QoS controlling unit 14 compares the acquired response performance and accuracy with the response performance (310.1 milliseconds) and analysis accuracy (72%) calculated at step S3 as described above and, because the response performance exceeds the target value of 300 milliseconds, determines that QoS control is necessary (step S4: Yes) and proceeds to step S5.

Subsequently, at step S5, the QoS controlling unit 14 judges the possibility of increase of the QoS to confirm whether the media storing unit 101, the analysis engine 102 or the media inputting unit 100 can increase the QoS so as to satisfy the user's target response performance and analysis accuracy.

The QoS controlling unit 14 sends a query whether it is possible to increase the performance to the QoS calculating unit 16, and the QoS calculating unit 16 sends a query whether it is possible to increase the performance to the media inputting unit 100, the media storing unit 101 and the analysis engine 102. Then, the media inputting unit 100, media storing unit 101 and analysis engine 102 having received the query returns whether it is possible to increase the performance and the response performance. The analysis engine 102 also returns the analysis accuracy in addition to the above.

To be specific, because the media inputting unit 100 currently handles an "image" as media data, as shown in FIG. 3, it is possible to substitute a method for converting the size of inputted media data with a conversion lower limit value "size (kbyte)×0.2" and, in this case, the size becomes 20 kbyte from calculation 100×0.2. Consequently, the response performance as an input transfer time of the media data after conversion is 40 milliseconds from calculation 20×2. Thus, because this response performance is faster than the original response performance "100×2=200 milliseconds," the media inputting unit 100 returns "it is possible to increase the performance," a "characteristics conversion lower limit value 100×0.2=20 kbyte that is the size as a media characteristic," which is a substitutable media data conversion method as a performance increasing means, and "200−40=160 milliseconds" obtained by subtracting a performance value of a substitutable media data input method after change from the original performance value as a performance increase value.

Further, with regard to the media storing unit 101, as shown in FIG. 4, a media data storage destination can be substituted from "HDD" to "memory," and response performance of the storage method is "10×100/1000=1 millisecond." Because this is faster than 100 milliseconds of the current method of storing into the HDD, the media storing unit 101 returns to the QoS calculating unit 16, "it is possible to increase the performance," a storage destination "memory" as a performance increasing means, and "100−1=99 milliseconds" as a performance increase value by a substitutable storage method.

Further, the analysis engine 102, which currently uses analysis methods such as "face contour acquisition" and "face matching judgment in color" of the analysis engine A, confirms a substitutable method from among the analysis methods of the analysis engine 102 shown in FIG. 5 and calculates whether there is a possibility of increase of the performance. Then, because the analysis method "face matching judgment in color" can be substituted with "face matching judgment by black-and-while conversion," the analysis engine 102 confirms the response performance and analysis accuracy after substitution. The response performance is 2×10=20 milliseconds in the case of face matching judgment by black-and-while conversion, and is 10×10=100 milliseconds in the case of face matching judgment in color. Moreover, the analysis accuracy is 100×10/100×8=80% in the case of face matching judgment by black-and-while conversion. The analysis engine 102 can increase the response performance by substituting the analysis method, and therefore, returns "it is possible to increase the performance," a substitutable analysis method "face matching judgment by black-and-while conversion" as a performance increasing means, and "100−20=80 milliseconds" as a performance increase value. Because the accuracy of combination of face matching judgment by black-and-while conversion and face contour acquisition is (90/100)×(80/100)×100, the accuracy of the analysis engine A is 72%. Therefore, the analysis engine 102 also returns "90%×80%=72%" as the analysis accuracy.

Thus, the QoS controlling unit 14 receives that all of the media inputting unit 100, the media storing unit 101 and the analysis engine 102 can increase the performance, from the QoS calculating unit 16. Because the analysis accuracy is 72%, which exceeds 70% as the target value of the user A according to FIG. 6, the QoS controlling unit 14 judges that it is possible to increase the performance while satisfying the user's target accuracy, and determines a QoS controlling method.

The QoS controlling unit 14 selects the media inputting unit 100 as a QoS control target from among the media inputting unit 100, the media storing unit 101 and the analysis engine 102, because the media inputting unit 100 can show the highest performance increase value "160 milliseconds" among the three units and can change the response performance of the media analysis system to "310.1−160=150.1 milliseconds," which is lower than 300 milliseconds of the user A's target value. Then, the QoS controlling unit 14 determines a performance increasing means of a "characteristics conversion lower limit value 20×0.2=10 kbyte of the size as the media characteristic" of the media inputting unit 100 returned from the QoS calculating unit 16, as a QoS controlling method.

Subsequently, at step S6, the QoS controlling unit 14 designates the QoS controlling method determined at the forward step, and performs QoS control instruction. Then, the media input controlling unit 18 controls the media inputting unit 100 to convert a media data input method by the media inputting unit 100 so that the media characteristic "size" designated by the QoS controlling unit 14 is converted into 20 kbyte of a conversion value of the media characteristic.

Finally, at step S7, the QoS controlling unit 14 executes an analysis process on the analysis engine 102.

According to the present invention, owing to the configuration and operation as described above, even when the performance of the media analysis system exceeds the user's target value as a result of calculation, it is possible to make the performance closer to one desired by the user in consideration of a relation between the accuracy and the performance, by making a performance increase instruction to decrease the input quality of the media inputting unit 100, change the storage method of the media storing unit 101 to increase the response performance, or increase the response performance of the media analysis engine 102, in accordance with the user's target values of the accuracy and the performance.

Although a case in which the QoS controlling unit 14 decreases the quality of inputted media data by changing the media characteristics of the media inputting unit 100 is exemplified above, the QoS controlling unit 14 may select any combination such that the total value of the response performance in the media inputting unit 100, the media storing unit 101 and the analysis engine 102 becomes lower than a user's target value of the response performance, and instruct the respective units 100, 101 and 102 to increase the performance. For example, in the above example, the QoS controlling unit 14 may change all of a media data conversion method in the media inputting unit 100, an analysis method in the analysis engine 102 and a storage method in the media storing unit 101 to substitutable methods, or may select and change any one or two of them.

Thus, by changing a combination of media quality control in the media inputting unit 100, an analysis method in the analysis engine 102 and a storing means in the media storing unit 101 so that user's response performance and analysis accuracy managed by the non-functional requirement target managing unit 15 are satisfied, it is possible to make the QoS and accuracy closer to the user's target values while changing a control target for increasing the QoS. Consequently, flexible selection for performance increase is allowed, for example, combining destinations for instruction to increase the performance by the QoS controlling unit 14 and instructing a plurality of destinations to increase the performance so as to obtain the highest performance, or instructing the minimum performance increase and decreasing the number of units to change.

Thus, according to the present invention, by decreasing the analysis accuracy and the input data quality to make the analysis performance closer to a user's target value in accordance with performance that is determined by a user's request and should be satisfied by the analysis engine 102, based on the accuracy and performance of the analysis engine 102, a developer of a media application can develop a media application without being conscious of performance characteristics like throughput and turnaround time to response, such as performance characteristics of an analysis method in the analysis engine 102. Therefore, for development of a media application, it is possible to use as middleware that can make the performance of the analysis engine 102 closer to the user's target value.

<Supplementary Notes>

The whole or part of the exemplary embodiments disclosed above can be described as the following supplementary notes. Below, an overview of the configurations of an information processing device according to the present invention will be described with reference to FIG. 8. However, the present invention is not limited to the following configurations.

(Supplementary Note 1)

An information processing device 200 including:

a characteristics information storing means 203 for storing analysis characteristics information representing performance of each analysis method executed in a media analysis system which analyzes predetermined media data, and media characteristics information representing performance of each method of input of the media data inputted into and analyzed by the media analysis system;

a QoS calculating unit 201 for calculating response performance and analysis accuracy when executing an analysis process in the media analysis system by preset media data input method and analysis method, based on the analysis characteristics information and the media characteristics information stored by the characteristics information storing means; and a QoS controlling unit 202 for, in a case that at least one of the response performance and the analysis accuracy calculated by the QoS calculating unit does not satisfy a preset target value, changing at least one of the preset media data input method and analysis method, based on the analysis characteristics information and the media characteristics information stored by the characteristics information storing means.

(Supplementary Note 2)

The information processing device according to Supplementary Note 1, wherein the analysis characteristics information stored by the characteristics information storing means includes another analysis method substitutable for a predetermined analysis method, and the media characteristics information stored by the characteristics information storing means includes another input method substitutable for a predetermined method of input of the media data; and the QoS controlling unit is configured to change at least one of the preset media data input method and analysis method to another substitutable method stored by the characteristics information storing means.

(Supplementary Note 3)

The information processing device according to Supplementary Note 2, wherein;

the media characteristics information stored by the characteristics information storing means includes a method of conversion of media data inputted into and analyzed by the media analysis system, as the input method, and also includes another conversion method substitutable for the conversion method; and the QoS controlling unit is configured to change a conversion method as the preset media data input method to another substitutable method, based on the media characteristics information.

(Supplementary Note 4)

The information processing device according to Supplementary Note 2 or 3, wherein:

the media characteristics information stored by the characteristics information storing means includes a method of storage of media data inputted into and analyzed by the media analysis system, as the input method, and also includes another storage method substitutable for the storage method; and the QoS controlling unit is configured to change a storage method as the preset media data input method to another substitutable method, based on the media characteristics information.

(Supplementary Note 5)

The information processing device according to any of Supplementary Notes 1 to 4, wherein:

the analysis characteristics information stored by the characteristic information storing means includes methods of calculation of analysis accuracy of each analysis method and calculation of a processing time, as information representing performance of the analysis method;

the media characteristics information stored by the characteristics information storing means includes methods of calculation of processing times in respective media data input methods, as information representing performance of the input method; and the QoS calculating unit is configured to calculate the analysis accuracy of the media analysis system based on the analysis characteristics information, and also calculate a processing time of the media analysis system based on the analysis characteristics information and the media characteristics information, as the response performance.

(Supplementary Note 6)

The information processing device according to Supplementary Note 5, wherein the QoS controlling unit is configured to change at least one of the preset media data input method and analysis method so that at least one of the processing time and the analysis accuracy becomes closer to a target value.

(Supplementary Note 7)

The information processing device according to Supplementary Note 6, wherein the QoS controlling unit is configured to change at least one of the preset media data input method and analysis method so that the calculated processing time of the media analysis system becomes lower than a target value.

(Supplementary Note 8)

A computer program including instructions for causing an information processing device including a characteristics information storing means for storing analysis characteristics information representing performance of each analysis method executed in a media analysis system analyzing predetermined media data, and media characteristics information representing performance of each method of input of the media data inputted into and analyzed by the media analysis system, to realize;

a QoS calculating unit for calculating response performance and analysis accuracy when executing an analysis process in the media analysis system by preset media data input method and analysis method, based on the analysis characteristics information and the media characteristics information stored by the characteristics information storing means; and a QoS controlling unit for, in a case that at least one of the response performance and the analysis accuracy calculated by the QoS calculating unit does not satisfy a preset target value, changing at least one of the preset media data input method and analysis method, based on the analysis characteristics information and the media characteristics information stored by the characteristics information storing means.

(Supplementary Note 9)

The computer program according to Supplementary Note 8, wherein the analysis characteristics information stored by the characteristics information storing means includes another analysis method substitutable for a predetermined analysis method, and the media characteristics information stored by the characteristics information storing means includes another input method substitutable for a predetermined method of input of the media data; and the QoS controlling unit is configured to change at least one of the preset media data input method and analysis method to another substitutable method stored by the characteristics information storing means.

(Supplementary Note 10)

An information processing method, wherein analysis characteristics information representing performance of each analysis method executed in a media analysis system which analyzes predetermined media data, and media characteristics information representing performance of each method of input of the media data inputted into and analyzed by the media analysis system are stored in a characteristics information storing means, the information processing method including:

calculating response performance and analysis accuracy when executing an analysis process in the media analysis system by preset media data input method and analysis method, based on the analysis characteristics information and the media characteristics information stored in the characteristics information storing means; and in a case that at least one of the response performance and the analysis accuracy having been calculated does not satisfy a preset target value, changing at least one of the preset media data input method and analysis method, based on the analysis characteristics information and the media characteristics information stored in the characteristics information storing means.

(Supplementary Note 11)

The information processing method according to Supplementary Note 10, wherein the analysis characteristics information stored by the characteristics information storing means includes another analysis method substitutable for a predetermined analysis method, and the media characteristics information stored by the characteristics information storing means includes another input method substitutable for a predetermined method of input of the media data; and the QoS controlling unit is configured to change at least one of the preset media data input method and analysis method to another substitutable method stored by the characteristics information storing means.

The present invention is based upon and claims the benefit of priority from Japanese patent application No. 2010-249263, filed on Nov. 8, 2010, the disclosure of which is incorporated herein in its entirety by reference.

DESCRIPTION OF REFERENCE NUMERALS

1 QoS controlling device
11 media characteristics judging unit
12 acquisition media characteristics rule managing unit
13 media storage processing unit
14 QoS controlling unit
15 target non-functional requirement managing unit
16 QoS calculating unit
17 media system QoS characteristics knowledge managing unit
18 media input controlling unit
19 media storage controlling unit
20 analysis engine controlling unit
100 media inputting unit
101 media storing unit
102 analysis engine
200 information processing device
201 QoS calculating unit
202 QoS controlling unit
203 characteristic information storing unit

What is claimed is:

1. An information processing device including a processor, comprising:

a characteristics information storing unit for storing analysis characteristics information representing performance of each analysis method executed in a media analysis system which analyzes predetermined media data, and media characteristics information representing performance of each method of input of the media data inputted into and analyzed by the media analysis system;

a QoS calculating unit being implemented by the processor, for calculating response performance and analysis accuracy when executing an analysis process in the media analysis system by preset media data input method and analysis method, based on the analysis characteristics information and the media characteristics information stored by the characteristics information storing unit; and a QoS controlling unit being implemented by the processor for, in a case that at least one of the response performance and the analysis accuracy calculated by the QoS calculating unit does not satisfy a preset target value, changing at least one of the preset media data input method and analysis method, based on the analysis characteristics information and the media characteristics information stored by the characteristics information storing unit, wherein:

the analysis characteristics information stored by the characteristic information storing unit includes methods of calculation of analysis accuracy of each analysis method and methods of calculation of a processing time in each analysis method, as information representing performance of the analysis method;

the media characteristics information stored by the characteristics information storing unit includes methods of calculation of a processing time in each media data input method, as information representing performance of the input method; and the QoS calculating unit is configured to calculate the analysis accuracy of the media analysis system based on the analysis characteristics information, and also calculate a processing time of the media analysis system based on the analysis characteristics information and the media characteristics information, as the response performance.

2. The information processing device according to claim 1, wherein the analysis characteristics information stored by the characteristics information storing unit includes another analysis method substitutable for a predetermined analysis method, and the media characteristics information stored by the characteristics information storing unit includes another input method substitutable for a predetermined method of input of the media data; and the QoS controlling unit is configured to change at least one of the preset media data input method and analysis method to another substitutable method stored by the characteristics information storing unit.

3. The information processing device according to claim 2, wherein;

the media characteristics information stored by the characteristics information storing unit includes a conversion method of media data inputted into and analyzed by the media analysis system, as the input method, and also includes another conversion method substitutable for the conversion method; and the QoS controlling unit is configured to change a conversion method as the preset media data input method to another substitutable method, based on the media characteristics information.

4. The information processing device according to claim 2, wherein:

the media characteristics information stored by the characteristics information storing unit includes a storage method of media data inputted into and analyzed by the media analysis system, as the input method, and also includes another storage method substitutable for the storage method; and the QoS controlling unit is configured to change a storage method as the preset media data input method to another substitutable method, based on the media characteristics information.

5. The information processing device according to claim 1, wherein the QoS controlling unit is configured to change at least one of the preset media data input method and analysis method so that at least one of the processing time and the analysis accuracy becomes closer to a target value.

6. The information processing device according to claim 5, wherein the QoS controlling unit is configured to change at least one of the preset media data input method and analysis method so that the calculated processing time of the media analysis system becomes lower than a target value.

7. A non-transitory computer-readable medium storing a program comprising instructions for causing an information processing device including a characteristics information storing unit for storing analysis characteristics information representing performance of each analysis method executed in a media analysis system analyzing predetermined media data, and media characteristics information representing performance of each method of input of the media data inputted into and analyzed by the media analysis system, to realize;

a QoS calculating unit for calculating response performance and analysis accuracy when executing an analysis process in the media analysis system by preset media data input method and analysis method, based on the analysis characteristics information and the media characteristics information stored by the characteristics information storing unit; and a QoS controlling unit for, in a case that at least one of the response performance and the analysis accuracy calculated by the QoS calculating unit does not satisfy a preset target value, changing at least one of the preset media data input method and analysis method, based on the analysis characteristics information and the media characteristics information stored by the characteristics information storing unit, wherein:

the analysis characteristics information stored by the characteristic information storing unit includes methods of calculation of analysis accuracy of each analysis method and methods of calculation of a processing time in each analysis method, as information representing performance of the analysis method;

the media characteristics information stored by the characteristics information storing unit includes methods of calculation of a processing time in each media data input method, as information representing performance of the input method; and the QoS calculating unit is configured to calculate the analysis accuracy of the media analysis system based on the analysis characteristics information, and also calculate a processing time of the media analysis system based on the analysis characteristics information and the media characteristics information, as the response performance.

8. An information processing method, wherein analysis characteristics information representing performance of each analysis method executed in a media analysis system which analyzes predetermined media data, and media characteristics information representing performance of each method of input of the media data inputted into and analyzed by the media analysis system are stored in a characteristics information storing unit, the information processing method comprising:

calculating response performance and analysis accuracy when executing an analysis process in the media analysis system by preset media data input method and analysis method, based on the analysis characteristics information and the media characteristics information stored in the characteristics information storing unit; and in a case that at least one of the response performance and the analysis accuracy having been calculated does not satisfy a preset target value, changing at least one of the preset media data input method and analysis method, based on the analysis characteristics information and the media characteristics information stored in the characteristics information storing unit, wherein:

the analysis characteristics information stored by the characteristic information storing unit includes methods of calculation of analysis accuracy of each analysis method and methods of calculation of a processing time in each analysis method, as information representing performance of the analysis method;

the media characteristics information stored by the characteristics information storing unit includes methods of calculation of a processing time in each media data input method, as information representing performance of the input method; and the QoS calculating unit is configured to calculate the analysis accuracy of the media analysis system based on the analysis characteristics information, and also calculate a processing time of the media analysis system based on the analysis characteristics information and the media characteristics information, as the response performance.

* * * * *